United States Patent
Begleiter et al.

(10) Patent No.: US 8,631,889 B2
(45) Date of Patent: Jan. 21, 2014

(54) COMBINED CONDENSATION RADIATOR FAN MODULE AND BRAKE COOLING DUCT SHUTTER SYSTEM

(76) Inventors: David Begleiter, Toronto (CA); Steven J. Weber, Mount Clemens, MI (US)

(*) Notice: Subject to any disclaimer, the term of this patent is extended or adjusted under 35 U.S.C. 154(b) by 245 days.

(21) Appl. No.: 13/163,934

(22) Filed: Jun. 20, 2011

(65) Prior Publication Data
US 2012/0318476 A1    Dec. 20, 2012

(51) Int. Cl.
*F01P 9/00* (2006.01)
*B60K 11/08* (2006.01)

(52) U.S. Cl.
CPC .................... *B60K 11/085* (2013.01)
USPC ....................................................... 180/68.1

(58) Field of Classification Search
CPC .................. B60K 11/085; B60H 2001/00092; B60T 5/00
USPC ............. 180/68.2, 68.1; 188/264 AA, 264 A; 192/113.23
See application file for complete search history.

(56) References Cited

U.S. PATENT DOCUMENTS

| | | | | |
|---|---|---|---|---|
| 2,276,279 | A * | 3/1942 | Asklund ...................... | 180/68.1 |
| 4,457,558 | A * | 7/1984 | Ishikawa .................... | 296/180.5 |
| 4,653,788 | A * | 3/1987 | Di Giusto ..................... | 293/117 |
| 4,805,747 | A * | 2/1989 | Moedinger et al. ....... | 188/264 A |
| 4,924,826 | A * | 5/1990 | Vinson ...................... | 123/195 C |
| 6,315,091 | B1 * | 11/2001 | Nilsen et al. .............. | 188/264 A |
| 6,854,544 | B2 * | 2/2005 | Vide ............................ | 180/68.6 |
| 7,600,615 | B2 * | 10/2009 | Ramsay et al. ........ | 188/264 AA |
| 2008/0133090 | A1 * | 6/2008 | Browne et al. .................. | 701/49 |
| 2010/0139583 | A1 * | 6/2010 | Klotz et al. ................ | 123/41.04 |
| 2010/0147611 | A1 * | 6/2010 | Amano et al. ............... | 180/68.1 |

* cited by examiner

*Primary Examiner* — John R Olszewski
*Assistant Examiner* — Brian Cassidy
(74) *Attorney, Agent, or Firm* — Quinn Law Group, PLLC

(57) ABSTRACT

A vehicle includes a body that defines an opening in a forward end thereof. A heat exchanger and an inlet of a brake duct are each positioned rearward of the opening to receive a flow of air through the opening. A shutter system is movable between an open position to allow airflow through the opening and a closed position to block airflow through the opening. The shutter system controls the airflow to both the heat exchanger and to the inlet of the brake duct.

18 Claims, 3 Drawing Sheets

COMBINED CONDENSATION RADIATOR FAN MODULE AND BRAKE COOLING DUCT SHUTTER SYSTEM

TECHNICAL FIELD

The invention generally relates to a vehicle and a method of controlling the vehicle.

BACKGROUND

Vehicles include a heat exchanger assembly for removing heat from an engine coolant to cool an engine. The heat exchanger assembly may include but is not limited to a radiator for cooling the engine coolant, a condenser for condensing a refrigerant, and a fan module for drawing a flow of air through both the radiator and condenser. Such a heat exchanger may be referred to as a Condensation Radiator Fan Module (CRFM). The CRFM is disposed near a forward end of the vehicle, adjacent and rearward of a forward opening in the body. The opening allows airflow through the body and across the CRFM. In order to increase fuel efficiency, some vehicles have incorporated a shutter system interposed between the CRFM and the opening to control the airflow through the opening. The shutter system is movable between an open position allowing airflow through the opening, and a closed position blocking airflow through the opening. When the engine is not in need of cooling, the shutter system is positioned in the closed position to block airflow through the opening, thereby reducing aerodynamic drag on the vehicle which increases the fuel efficiency of the vehicle.

Many vehicles also include a brake duct. The brake duct includes an inlet disposed adjacent the forward end of the vehicle, and collects a flow of air which is directed to a brake system to cool the brake system. Typically, the inlet of the brake duct is in fluid communication with a brake cooling opening in the forward end of the body, often disposed at an outboard lower vertical edge of the forward end of the body. The air flows through the brake cooling opening and through the brake duct continuously when the vehicle is in motion, even when the brake system does not require cooling. This continuous airflow through the brake cooling opening and brake duct introduces a constant aerodynamic drag onto the vehicle, thereby limiting the performance of the vehicle and reducing fuel efficiency of the vehicle.

SUMMARY

A vehicle is provided. The vehicle includes a body that extends along a longitudinal axis between a forward end and a rearward end. The body defines an engine compartment that is disposed adjacent the forward end of the body. The body further defines an opening that is disposed at the forward end of the body. The opening is configured for allowing airflow through the body and into the engine compartment. A heat exchanger is disposed within the engine compartment adjacent the opening. The heat exchanger is positioned relative to the opening to receive the airflow through the opening. The vehicle includes a brake duct that includes an inlet disposed within the engine compartment. The inlet of the brake duct is positioned relative to the opening to receive the airflow through the opening. The brake duct is configured for directing a portion of the airflow received through the opening to a brake system to cool the brake system. A shutter system is disposed within the engine compartment. The shutter system is disposed along the longitudinal axis between the heat exchanger and the opening, and also between the inlet of the brake duct and the opening. The shutter system is movable between an open position and a closed position. When in the open position, the shutter system allows the airflow through the opening and across the heat exchanger and into the inlet of the brake duct. When in the closed position, the shutter system blocks the airflow through the opening. The shutter system simultaneously controls the airflow to both the heat exchanger and the brake duct.

A vehicle is also provided. The vehicle includes a body extending along a longitudinal axis between a forward end and a rearward end. The body defines an engine compartment that is disposed adjacent the forward end of the body. The body further defines an opening that is disposed at the forward end of the body. The opening is configured for allowing airflow through the body and into the engine compartment. A heat exchanger is disposed within the engine compartment adjacent the opening. The heat exchanger is positioned relative to the opening to receive the airflow through the opening. The vehicle further includes a brake duct. The brake duct includes an inlet that is disposed within the engine compartment. The inlet of the brake duct is positioned relative to the opening to receive the airflow through the opening. The inlet of the brake duct is disposed adjacent the heat exchanger and laterally outboard of the heat exchanger relative to the longitudinal axis. The brake duct is configured for directing a portion of the airflow received through the opening to a brake system to cool the brake system. A shutter system is disposed within the engine compartment and along the longitudinal axis between the heat exchanger and the opening, and between the inlet of the brake duct and the opening. The shutter system is movable between an open position and a closed position. When in the open position, the shutter system allows the airflow through the opening and across the heat exchanger and into the inlet of the brake duct. When in the closed position, the shutter system blocks the airflow through the opening. The shutter system simultaneously controls the airflow to both the heat exchanger and the brake duct. The opening defines a width measured perpendicular relative to the longitudinal axis of the body. Both the heat exchanger and the inlet of the brake duct are laterally disposed relative to the longitudinal axis within the width of the opening. The vehicle includes a controller that is coupled to the shutter system and configured for controlling a position of the shutter system. The controller is configured to position the shutter system in the closed position only when neither the heat exchanger nor the brake system require cooling. The controller is configured to position the shutter system in the open position when cooling of either the heat exchanger or the brake system is required.

A method of controlling a vehicle is also provided. The method includes positioning an inlet of a brake duct laterally adjacent to and outboard of a heat exchanger relative to a longitudinal axis of the vehicle. Both the heat exchanger and the inlet of the brake duct are positioned relative to a single opening in a forward end of the vehicle to receive airflow through the opening. A shutter system disposed between the opening and the heat exchanger is controlled to simultaneously control the airflow to both the heat exchanger and the brake duct.

Accordingly, by positioning the inlet of the brake duct adjacent the heat exchanger in a position to receive airflow through the same opening in the forward end of the body as the heat exchanger, the shutter system may be used to control airflow to both the heat exchanger and the brake duct. Accordingly, when neither engine cooling nor brake cooling is required, the shutter system can block airflow through the opening, thereby decreasing the aerodynamic drag on the vehicle, which increases the fuel efficiency of the vehicle.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," "forward," "rearward," etc., are used descriptively for the figures, and do not represent limitations on the scope of the invention, as defined by the appended claims.

Referring to the Figures, wherein like numerals indicate like parts throughout the several views, a vehicle is generally shown at 20. The vehicle 20 may include any type, size and/or style of vehicle 20, including but not limited to a passenger car, a truck, a van, etc.

Figure 1:
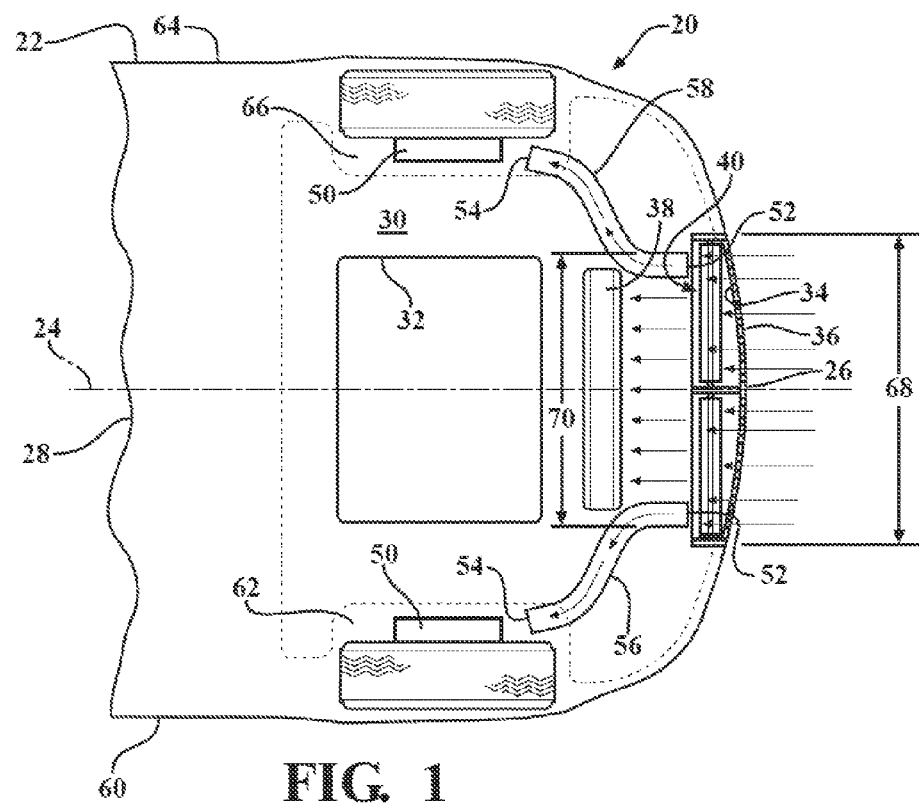
FIG. 1 is a schematic plan view of a vehicle showing a shutter system in an open position allowing airflow across a heat exchanger and through a pair of brake ducts.
Figure 2:
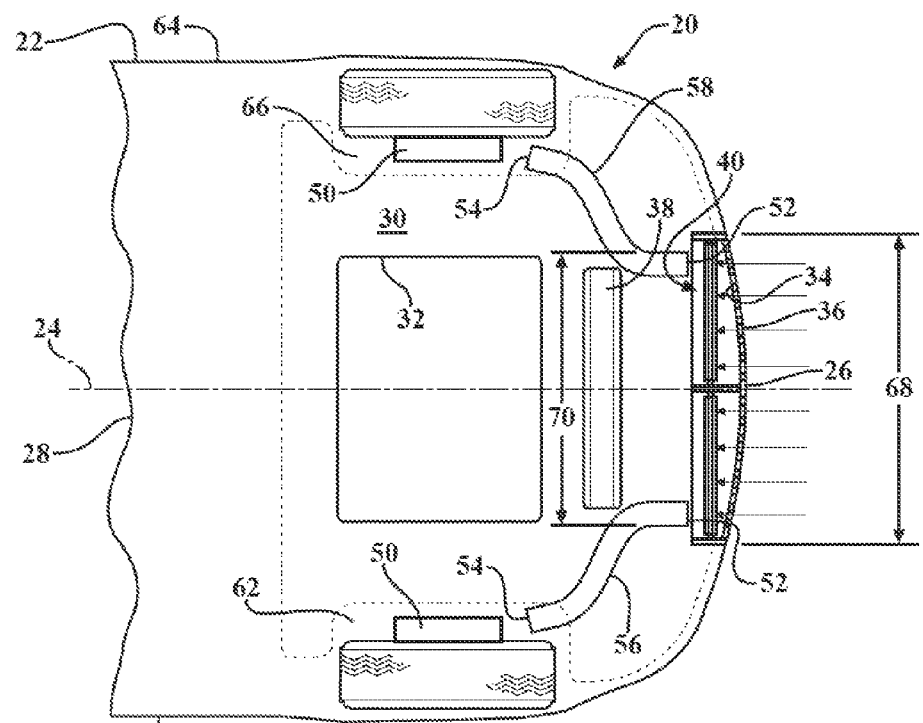
FIG. 2 is a schematic plan view of the vehicle showing the shutter system in a closed position blocking airflow to the heat exchanger and the brake ducts.
Figure 3:
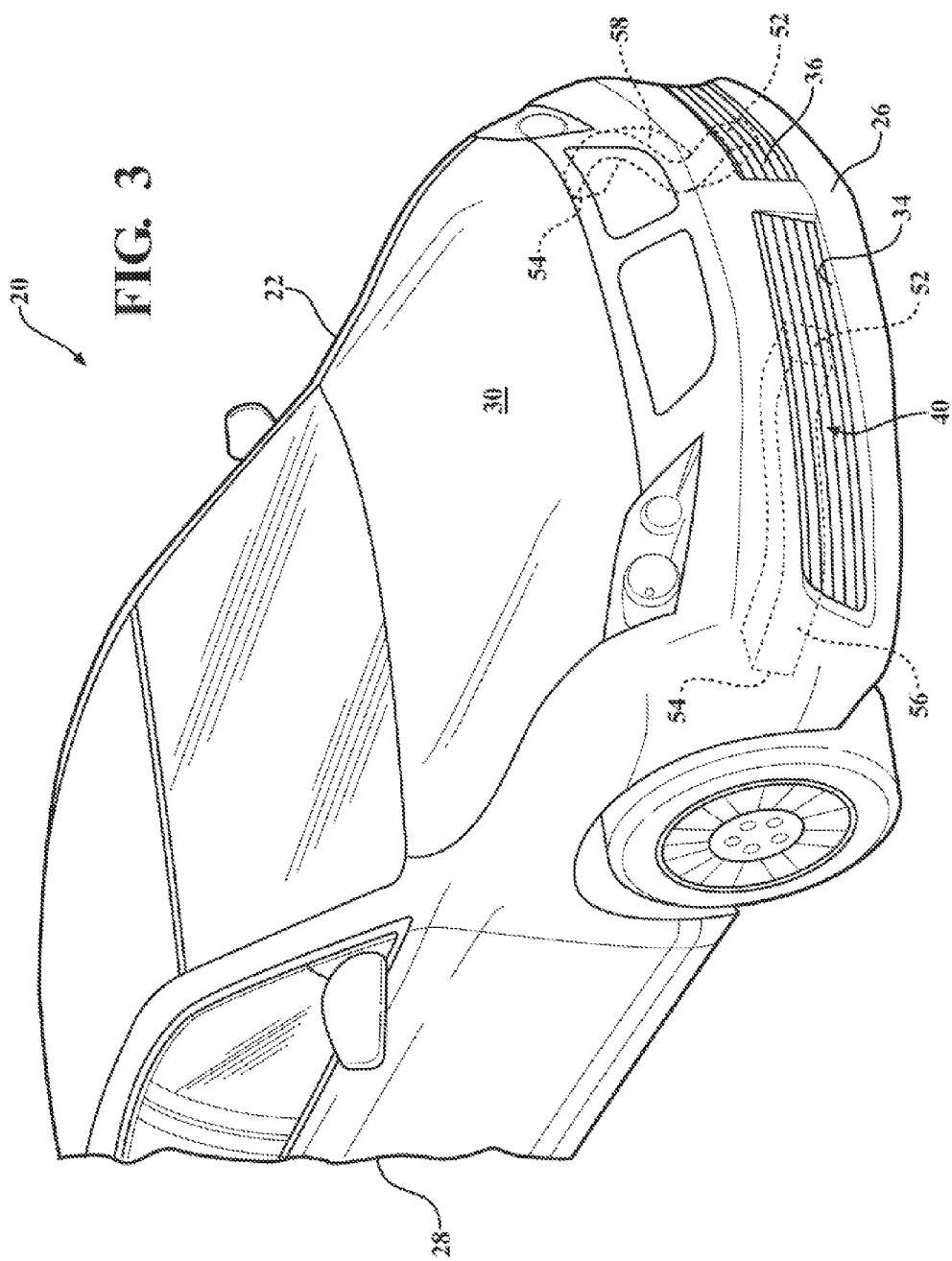
FIG. 3 is a schematic perspective view of a forward end of the vehicle showing an opening in the body.

Referring to FIGS. 1 and 2, the vehicle 20 includes a body 22 that extends along a longitudinal axis 24. The body 22 extends between a forward end 26, i.e., a front of the vehicle 20, and a rearward end 28, i.e., a back of the vehicle 20. The body 22 defines an engine compartment 30 disposed adjacent the forward end 26 of the body 22. A liquid cooled internal combustion engine 32 is disposed within the engine compartment 30 and is used to power the vehicle 20. Referring to FIG. 3, the body 22 further defines an opening 34 disposed at the forward end 26 of the body 22. The opening 34 is configured for allowing airflow through the body 22 and into the engine compartment 30. A grille 36 may be disposed within the opening 34 to define a plurality of smaller openings 34. The grille 36 resists objects from entering the engine compartment 30 through the opening 34, while still allowing airflow through the opening 34. The grille 36 may be integrally formed with the body 22, may be a separate component attached to the body 22 or may include both a first grille 36 portion integrally formed with the body 22 and a second grille 36 portion mechanically attached to the body 22.

Referring to FIGS. 1 and 2, the vehicle 20 further includes a heat exchanger 38 disposed within the engine compartment 30 adjacent the opening 34. The heat exchanger 38 is configured for dissipating heat from an engine coolant circulating through the internal combustion engine 32 and the heat exchanger 38 to cool the internal combustion engine 32. The heat exchanger 38 is positioned relative to the opening 34, i.e., directly rearward of the opening 34, to receive the airflow through the opening 34. Air flows through the opening 34 and across the heat exchanger 38, whereupon the air absorbs heat from the engine coolant, which is then dissipated into the ambient air. In the exemplary configuration shown, the heat exchanger 38 may further include a condenser that is configured for condensing a refrigerant of an air conditioning system, as well as a fan module for drawing air through the opening 34 and across the heat exchanger 38 and the condenser. The exemplary configuration shown may therefore be referred to as a Condensation Radiator Fan Module (CRFM).

A shutter system 40 is disposed within the engine compartment 30. The shutter system 40 is disposed between the heat exchanger 38 and the opening 34 along the longitudinal axis 24. The shutter system 40 is movable between an open position, generally shown in FIG. 1, and a closed position, generally shown in FIG. 2. When in the open position, the shutter system 40 allows the airflow through the opening 34 and across the heat exchanger 38. When in the closed position, the shutter system 40 blocks the airflow through the opening 34.

A controller is coupled to the shutter system 40. The controller is configured for positioning and/or moving the shutter system 40 between the open position and the closed position. The controller may include a computer, a control module or some other similar device.

Figure 4:
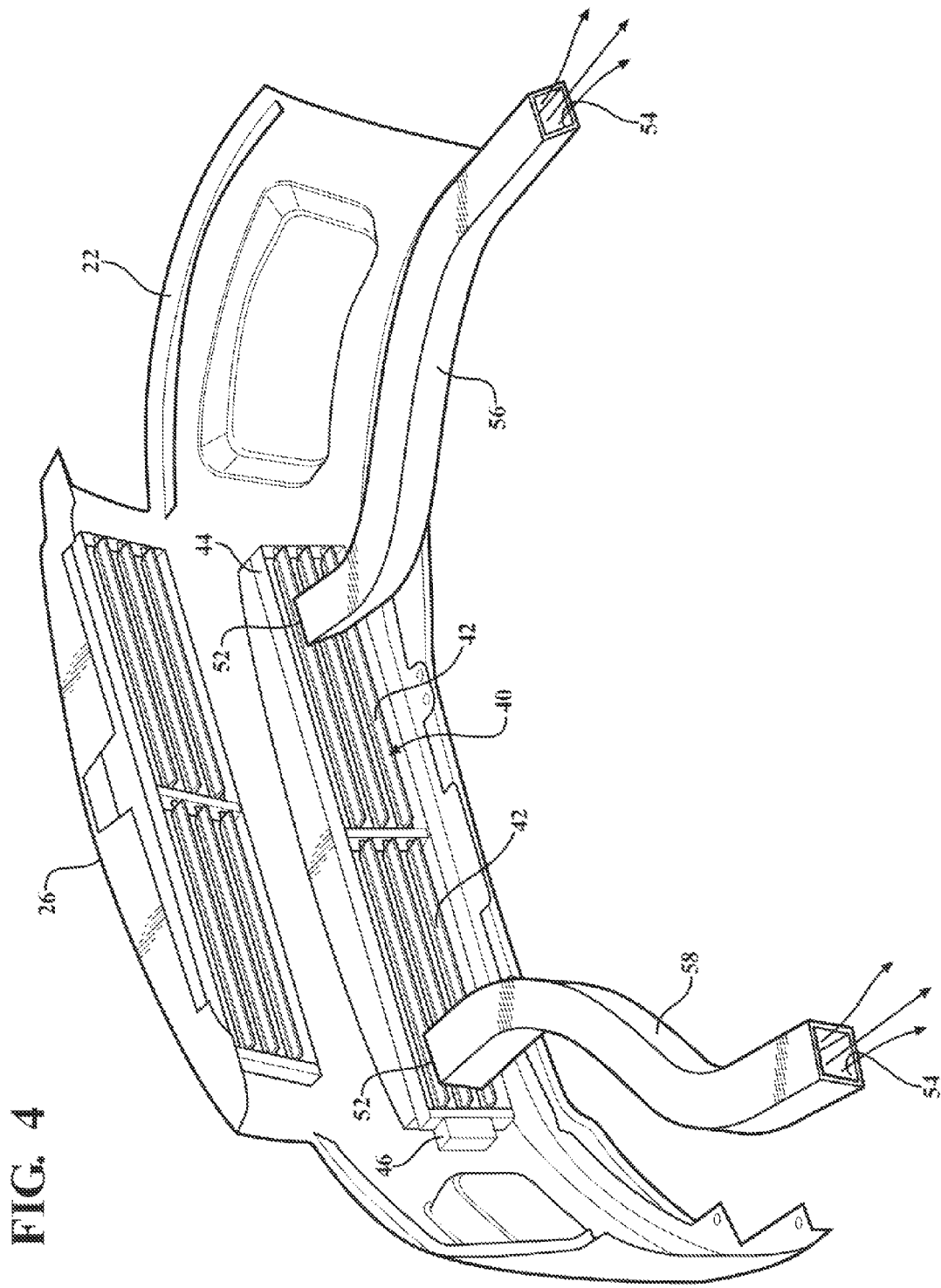
FIG. 4 is a schematic perspective view of the shutter system and the brake ducts.

The shutter system 40 may include any suitable system capable of opening and closing airflow through the opening 34. For example, referring to FIG. 4, the shutter system 40 may include a plurality of vanes 42. The vanes 42 may be coupled to the body 22 through a housing 44 or other structure. The vanes 42 are rotatably movable relative to the body 22 to define the open position and the closed position. The shutter system 40 may further include an actuator 46 that is coupled to the vanes 42. The actuator 46 is in communication with the controller, and is configured for rotating the vanes 42 between the open position and the closed position. The actuator 46 may include any suitable device capable of rotating the vanes 42, such as but not limited to an electric motor or an active material actuator 46. The shutter system 40 shown and described herein is exemplary. As such, it should be appreciated that the shutter system 40 may include some other system not shown or described herein, such as but not limited to linearly sliding vanes and/or panels. Accordingly, the scope of the claims are not limited to the exemplary embodiment of the shutter system 40 shown and described herein.

Referring back to FIGS. 1 and 2, the vehicle 20 further includes a brake duct 56, 58. The brake duct 56, 58 directs a flow of air to a brake system 50, e.g., a brake caliper, to cool the brake system 50. The brake duct 56, 58 includes an inlet 52 and an outlet 54. The inlet 52 is disposed within the engine compartment 30, and is positioned relative to the opening 34, i.e., rearward of the opening 34, to receive the airflow through the opening 34. The inlet 52 is further disposed laterally adjacent the heat exchanger 38. The shutter system 40 is disposed between the inlet 52 of the brake duct 56, 58 and the opening 34. The outlet 54 of the brake duct 56, 58 is disposed within a wheel well 62, 66, also defined by the body 22. The brake duct 56, 58 is configured for directing a portion of the airflow received through the opening 34 to the wheel well 62, 66 and the brake system 50 to cool the brake system 50. Accordingly, it should be appreciated that the opening 34 simultaneously provides the airflow to both the heat exchanger 38 and the brake duct 56, 58.

As shown, the brake duct 56, 58 includes a first brake duct 56 and a second brake duct 58. The first brake duct 56 and the second brake duct 58 are disposed on opposite sides of the longitudinal axis 24 of the vehicle 20, and flank either side of the heat exchanger 38. More specifically, the first brake duct 56 is disposed on a first side 60 of the longitudinal axis 24, and directs airflow to a first wheel well 62, and the second brake duct 58 is disposed on a second side 64 of the longitudinal axis 24, and directs airflow to a second wheel well 66. As such, the first brake duct 56 and the second brake duct 58 are approximately mirror images of each other across the longitudinal axis 24 of the body 22. For clarity, the description below describes the brake duct 56 with reference only to the first brake duct 56. However, it should be appreciated that the description of the first brake duct 56 within the scope of the invention is also applicable to the second brake duct 58. Furthermore, it should be appreciated that the scope of the claims do not require both the first brake duct 56 and the second brake duct 58, but only require one of the first brake duct 56 and the second brake duct 58, and that the vehicle is shown and described herein with both the first brake duct 56 and the second brake duct 58 as an exemplary embodiment.

As described above and shown in the Figures, the inlet 52 of the brake duct 56 is disposed adjacent the heat exchanger 38, and laterally outboard of the heat exchanger 38 relative to the longitudinal axis 24. As used herein, the term outboard is to be interpreted as being disposed farther away from. As such, the inlet 52 of the brake duct 56 is disposed farther from the longitudinal axis 24 than the heat exchanger 38, yet immediately adjacent thereto. However, it should be appreciated that the inlet 52 of the brake duct 56 may alternatively be disposed forward of the heat exchanger 38 and laterally inboard of the heat exchanger 38 relative to the longitudinal axis 24. As used herein, the term inboard is to be interpreted as being disposed nearer than.

The opening 34 defines a width 68 measured perpendicular relative to the longitudinal axis 24 of the body 22. Both the heat exchanger 38 and the inlet 52 of the brake duct 56 are laterally disposed relative to the longitudinal axis 24 within the width 68 of the opening 34. Accordingly, a distance 70, measured perpendicularly relative to the longitudinal axis 24 and spanning across the heat exchanger 38 and the inlet 52 of the brake duct 56, including the inlets 52 for both the first brake duct 56 and the second brake duct 58, is equal to or less than the width 68 of the opening 34. This configuration allows for airflow through the opening 34 to both the inlet 52 of the brake duct 56 and the heat exchanger 38.

The shutter system 40 simultaneously controls the airflow to both the heat exchanger 38 and the brake duct 56. As described above, the controller controls the position of the shutter system 40. The controller is configured to position the shutter system 40 in the closed position only when neither the heat exchanger 38 nor the brake system 50 require cooling. As such, if both the heat exchanger 38 and the brake system 50 do not require cooling, then the controller positions the shutter system 40 in the closed position to block airflow through the opening 34, thereby reducing the aerodynamic drag on the vehicle 20 which improves the fuel efficiency of the vehicle 20. When cooling of either the heat exchanger 38 or the brake system 50 is required, then the controller is configured to position the shutter system 40 in the open position, thereby allowing airflow through the opening 34 and across the heat exchanger 38 and into the inlet 52 of the brake duct 56. The controller may monitor one or more conditions and/or operating parameters of the vehicle 20 to identify when the shutter system 40 should be positioned in the open position, and when the shutter system 40 should be positioned in the closed position. Upon identifying a condition indicating that either the heat exchanger 38 or the brake system 50 may require cooling, the controller signals the actuator 46 to move and/or maintain the position of the shutter system 40 in the open position. Otherwise, the controller moves and/or maintains the position of the shutter system 40 in the closed position to optimize fuel efficiency of the vehicle 20. The controller may monitor conditions and/or operating parameters including but not limited to, a speed of the vehicle 20, a temperature of an engine of the vehicle 20, a temperature of an engine coolant, an ambient air temperature, a cabin air temperature, a vertical driving angle of the vehicle 20, an acceleration of the vehicle 20, or a state of position of a brake pedal (not shown).

A method of controlling the vehicle 20 is also provided. The method includes positioning the inlet 52 of the brake duct 56 laterally adjacent to and outboard of the heat exchanger 38 relative to the longitudinal axis 24 of the vehicle 20. As described above, both the heat exchanger 38 and the inlet 52 of the brake duct 56 are positioned relative to the single opening 34 in the forward end 26 of the vehicle 20 to receive airflow through the opening 34.

The shutter system 40 is disposed between the opening 34 and the heat exchanger 38 and between the opening 34 and the inlet 52 of the brake duct 56 to simultaneously control the airflow to both the heat exchanger 38 and the brake duct 56. A condition indicating that one of the heat exchanger 38 or the brake system 50 requires cooling is identified. As noted above, the condition may include but is not limited to one of a speed of the vehicle 20, a temperature of an engine of the vehicle 20, an ambient air temperature, a vertical driving angle of the vehicle 20 or an acceleration of the vehicle 20. Once the condition indicating that one of the heat exchanger 38 or the brake system 50 require cooling, then the shutter system 40 is positioned in the open position, i.e., the shutter system 40 is opened, to allow airflow to both the heat exchanger 38 and the inlet 52 of the brake duct 56, thereby allowing cooling of either or both of the heat exchanger 38 or the brake system 50 of the vehicle 20.

If the controller fails to identify a condition indicating that neither the heat exchanger 38 and/or the brake system 50 require cooling, then the controller may move and/or position the shutter system 40 in the closed position to block airflow through the opening 34. Similarly, upon the controller determining that a condition indicating that the heat exchanger 38 and/or the brake system 50 requires cooling is no longer valid, then the controller signals the actuator 46 to move the shutter system 40 into the closed position to block airflow to both the heat exchanger 38 and the inlet 52 of the brake duct 56.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
a body extending along a longitudinal axis between a forward end and a rearward end, wherein the body defines an engine compartment disposed adjacent the forward end of the body and an opening disposed at the forward end of the body and configured for allowing airflow through the body and into the engine compartment;
a heat exchanger disposed within the engine compartment adjacent the opening and positioned relative to the opening to receive the airflow through the opening;
a brake duct having an inlet disposed within the engine compartment and positioned relative to the opening to receive the airflow through the opening, wherein the brake duct is configured for directing a portion of the airflow received through the opening to a brake system to cool the brake system; and
a shutter system disposed within the engine compartment and along the longitudinal axis between the heat exchanger and the opening and between the inlet of the brake duct and the opening, wherein the shutter system is moveable between an open position allowing the airflow through the opening and across the heat exchanger and into the inlet of the brake duct, and a closed position blocking the airflow through the opening;
wherein the shutter system simultaneously controls the airflow to both the heat exchanger and the brake duct.

2. A vehicle as set forth in claim 1 wherein the opening defines a width measured perpendicular relative to the longitudinal axis of the body, with both the heat exchanger and the inlet of the brake duct laterally disposed relative to the longitudinal axis within the width of the opening.

3. A vehicle as set forth in claim 2 wherein the inlet of the brake duct is disposed adjacent the heat exchanger and laterally outboard of the heat exchanger relative to the longitudinal axis.

4. A vehicle as set forth in claim 2 wherein the brake duct includes a first brake duct and a second brake duct, with the first brake duct and the second brake duct disposed on opposite sides of the longitudinal axis flanking the heat exchanger.

5. A vehicle as set forth in claim 1 further comprising a controller coupled to the shutter system and configured for moving the shutter system between the open position and the closed position.

6. A vehicle as set forth in claim 5 wherein the controller is configured to position the shutter system in the closed position only when neither the heat exchanger nor the brake system require cooling.

7. A vehicle as set forth in claim 6 wherein the controller is configured to position the shutter system in the open position when cooling of either the heat exchanger or the brake system is required.

8. A vehicle as set forth in claim 5 wherein the shutter system includes:
a plurality of vanes coupled to the body and rotatably moveable relative to the body to define the open position and the closed position; and
an actuator coupled to the vanes and in communication with the controller, wherein the actuator is configured for rotating the vanes between the open position and the closed position.

9. A vehicle as set forth in claim 1 wherein the opening simultaneously provides the airflow to both the heat exchanger and the brake duct.

10. A vehicle as set forth in claim 1 further comprising a grille disposed within the opening.

11. A vehicle comprising:
a body extending along a longitudinal axis between a forward end and a rearward end, wherein the body defines an engine compartment disposed adjacent the forward end of the body and an opening disposed at the forward end of the body and configured for allowing airflow through the body and into the engine compartment;
a heat exchanger disposed within the engine compartment adjacent the opening and positioned relative to the opening to receive the airflow through the opening;
a brake duct having an inlet disposed within the engine compartment and positioned relative to the opening to receive the airflow through the opening, wherein the inlet of the brake duct is disposed adjacent the heat exchanger and laterally outboard of the heat exchanger relative to the longitudinal axis, and wherein the brake duct is configured for directing a portion of the airflow received through the opening to a brake system to cool the brake system;
a shutter system disposed within the engine compartment and along the longitudinal axis between the heat exchanger and the opening and between the inlet of the brake duct and the opening, wherein the shutter system is moveable between an open position allowing the airflow through the opening and across the heat exchanger and into the inlet of the brake duct, and a closed position blocking the airflow through the opening;
wherein the shutter system simultaneously controls the airflow to both the heat exchanger and the brake duct;
wherein the opening defines a width measured perpendicular relative to the longitudinal axis of the body, with both the heat exchanger and the inlet of the brake duct laterally disposed relative to the longitudinal axis within the width of the opening; and
a controller coupled to the shutter system and configured for controlling a position of the shutter system, wherein the controller is configured to position the shutter system in the closed position only when neither the heat exchanger nor the brake system require cooling, and wherein the controller is configured to position the shutter system in the open position when cooling of either the heat exchanger or the brake system is required.

12. A vehicle as set forth in claim 11 wherein the shutter system includes:
a plurality of vanes coupled to the body and rotatably moveable relative to the body to define the open position and the closed position; and
an actuator coupled to the vanes and in communication with the controller, wherein the actuator is configured for rotating the vanes between the open position and the closed position.

13. A method of controlling a vehicle, the method comprising:
positioning an inlet of a brake duct laterally adjacent to and outboard of a heat exchanger relative to a longitudinal axis of the vehicle, wherein both the heat exchanger and the inlet of the brake duct are positioned relative to a single opening in a forward end of the vehicle to receive airflow through the opening;
controlling a shutter system disposed between the opening and the heat exchanger to simultaneously control the airflow to both the heat exchanger and the brake duct.

14. A method as set forth in claim 13 wherein controlling the shutter system includes opening the shutter system to allow airflow to both the heat exchanger and the inlet of the brake duct to cool either the heat exchanger or a brake system of the vehicle.

15. A method as set forth in claim 14 wherein controlling the shutter system includes closing the shutter system to block airflow to both the heat exchanger and the inlet of the brake duct when neither the heat exchanger nor the brake system requires cooling.

16. A method as set forth in claim 15 wherein controlling the shutter system includes identifying a condition indicating that one of the heat exchanger or the brake system requires cooling.

17. A method as set forth in claim 16 wherein the condition includes one of a speed of the vehicle, a temperature of an engine of the vehicle, an ambient air temperature, a vertical driving angle of the vehicle, an acceleration of the vehicle, or a state of position of a brake pedal.

18. A method as set forth in claim 17 wherein the shutter system includes a plurality of vanes rotatably attached to the vehicle and rotatable relative to the opening, wherein controlling the shutter system includes simultaneously rotating the vanes to allow airflow through the opening or to block airflow through the opening.

* * * * *